Sept. 9, 1969  R. E. KOLECKI  3,465,854
BRAKE ADJUSTER

Filed Dec. 22, 1967  2 Sheets-Sheet 1

INVENTOR
RICHARD E. KOLECKI
BY Robert H. Johnson
ATTORNEY

Sept. 9, 1969 R. E. KOLECKI 3,465,854
BRAKE ADJUSTER
Filed Dec. 22, 1967 2 Sheets-Sheet 2

*INVENTOR*
RICHARD E. KOLECKI
BY Robert H. Johnson
ATTORNEY 3,465,854
BRAKE ADJUSTER
Richard E. Kolecki, Niles, Mich., assignor to Clark Equipment Company, a corporation of Michigan
Filed Dec. 22, 1967, Ser. No. 692,895
Int. Cl. F16d 65/38, 51/00
U.S. Cl. 188—196   2 Claims

ABSTRACT OF THE DISCLOSURE

An expandable internal shoe brake with a fluid actuator for expanding the shoes. Disposed in the actuator is a wear adjuster which limits retraction of the shoes. A helical compression spring is provided between the pistons of the actuator, the spring having a first portion with a given spring rate to accommodate lost motion in the slack adjusting operation, and a second portion with a spring rate lower than the given spring rate. A helical torsion spring encircles and biases the second spring portion to extend on slack adjustment movement.

BACKGROUND OF THE INVENTION

The field of art to which the invention pertains includes wear compensating devices for brakes.

A principal object of my invention is to provide a simple, low-cost brake wear adjuster.

SUMMARY OF THE INVENTION

In carrying out my invention in a preferred embodiment, I provide a helical compression spring having a first portion with a given spring rate and a second portion with a spring rate lower than the given spring rate. A helical torsion spring is disposed to encircle the second spring portion so that the second spring portion is biased to extend.

The above and other objects, features and advantages of my invention will be more readily understood by persons skilled in the art when the following detailed description is taken in conjunction with the drawing.

DESCRIPTION OF THE PREFERRED EMBODIMENT

Figure 1:
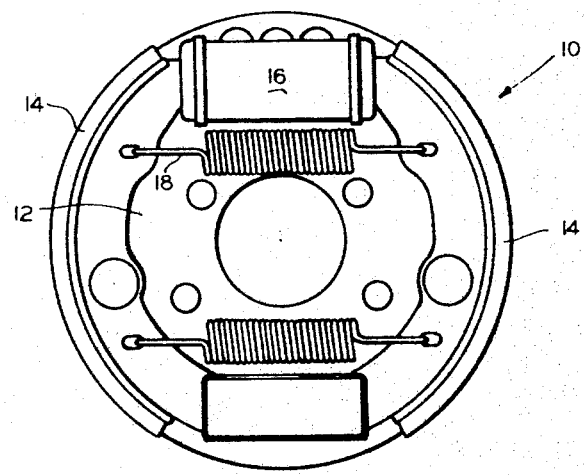
FIGURE 1 shows an expandable internal shoe type brake which embodies my invention.

Referring now to FIG. 1, the reference numeral 10 denotes generally an expandable internal shoe type brake including a spider or support plate 12 to which a pair of shoes 14 are connected. Also connected to spider 12 is an actuator 16 which is disposed between adjacent ends of shoes 14 and operable when energized to force the adjacent ends of shoes 14 apart in order to engage brake 10 as is conventional and well-known in the art. The adjacent ends of shoes are biased together by means of a helical tension spring 18 which is connected to shoes 14, as shown, and functions as a return spring to release brake 10 by pulling shoes 14 to the position shown when actuator 16 is no longer energized.

Referring now also to FIGS. 2 through 5, actuator 16 includes a body 20 with an elongated cylindrical bore 22 therein. Slidably disposed in bore 22 is a pair of spaced-apart pistons 24 which engage the adjacent ends of brake shoes 14, as shown. Also slidably disposed in bore 22 in spaced-apart relation is a pair of seals or cups 26 which sealingly engage bore 22 and abut pistons 24, as shown. Each seal 26 includes a pair of concentric inwardly extending sleeves 28 and 30 which serve as positioners, as will become apparent.

A chamber 32 is defined by bore 22 and seals 26. A supply port 34 communicates with chamber 32 and is connected to a source of pressurized fluid so that pressurized fluid can be supplied to chamber 32, thereby forcing seals 26 and pistons 24 apart in order to expand shoes 14, and thus engage brake 10.

As brake shoes 14 wear it will be obvious that each time brake 10 is engaged that it will be necessary to expand shoes 14 further. This means that a greater amount of pressurized fluid will have to be supplied to chamber 32 and that it will be necessary for seals 26 and pistons 24 to move further. This is considered undesirable in the operation of this type of brake, and so I have provided a wear adjuster 36 which serves to maintain substantially constant the expansion of brake shoes 14 that is necessary to engage brake 10 as brake shoes 14 wear.

Figure 5:
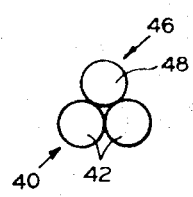
FIGURE 5 is a fragmentary cross-section on an enlarged scale of the wear adjuster springs.
Figure 4:
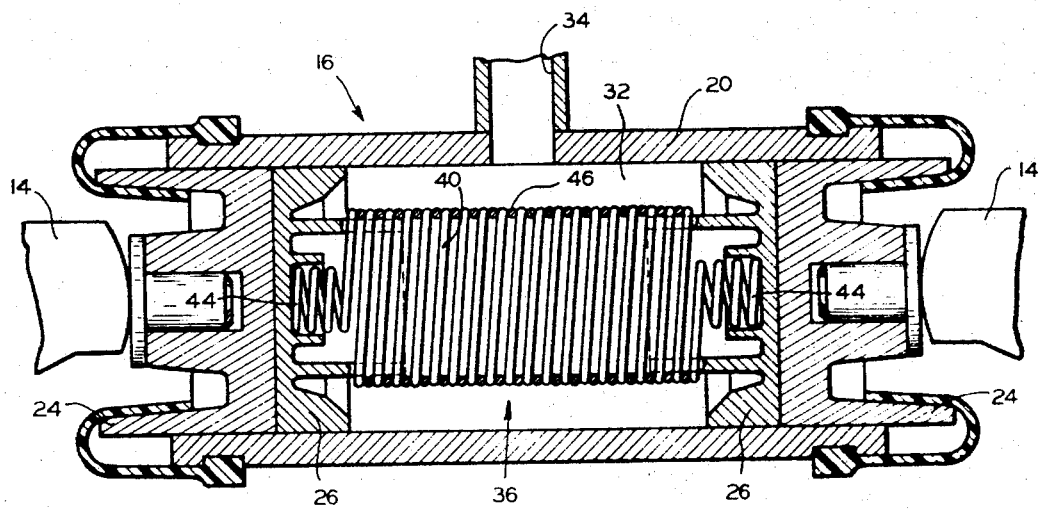
FIGURE 4 is similar to FIG. 2 and shows the wear adjuster in the fully adjusted position.

Adjuster 36 includes a helical compression spring 38 which includes an intermediate portion 40 having a plurality of turns 42 (FIG. 5) and a pair of outer portions 44. The spring rates of outer portions 44 preferably are substantially equal, and each spring rate is greater than the spring rate of intermediate portion 40. This insures that portions 44 will extend prior to intermediate portion 40 extending. Adjuster 36 also includes a helical torsion spring 46 having a plurality of turns 48 (FIG. 5). Spring 46 is disposed to encircle intermediate portion 40 of spring 38 and is under tension. That is, spring 46 tends to assume the same diameter as intermediate portion 40 of spring 38. Consequently, the turns 48 of spring 46 tend to work in between the turns 42 of intermediate portion 40 of spring 38 until the condition in FIG. 4 is reached.

Figure 6:
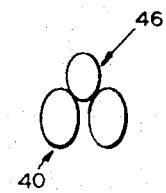
FIGURE 6 is a fragmentary cross-section of springs having a different shape which would be suitable for use with the adjuster.
Figure 7:
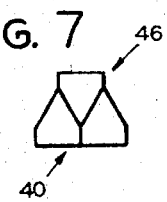
FIGURE 7 shows still another shape of springs which would be suitable for use with the adjuster.

While the turns of springs 38 and 46 are shown as circular in cross-section, see FIG. 5, in the preferred embodiment they are not limited to this shape and may be oval or generally triangular in cross-section, for example, as shown in FIGS. 6 and 7, respectively.

In order to enable persons skilled in the art to better understand my invention, I will now explain the operation of it.

Figure 2:
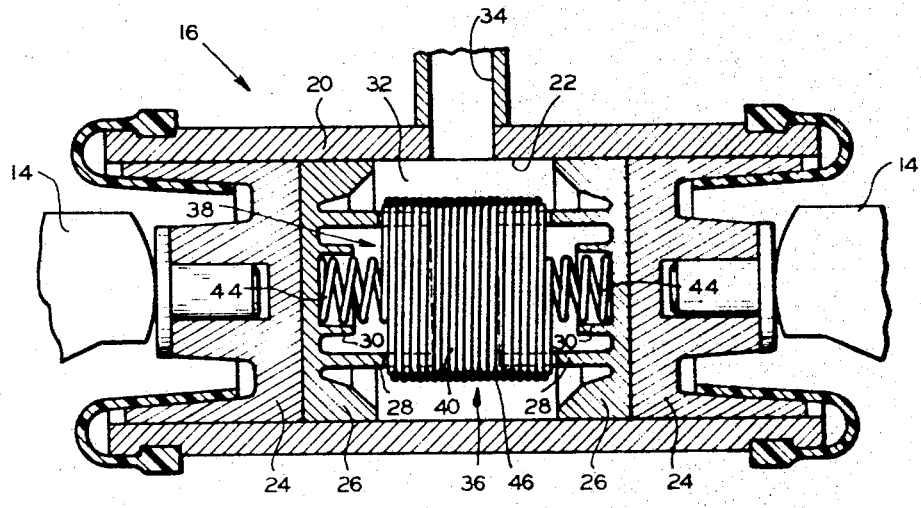
FIGURE 2 is a longitudinal cross-section of a brake actuator showing to advantage my invention.
Figure 3:
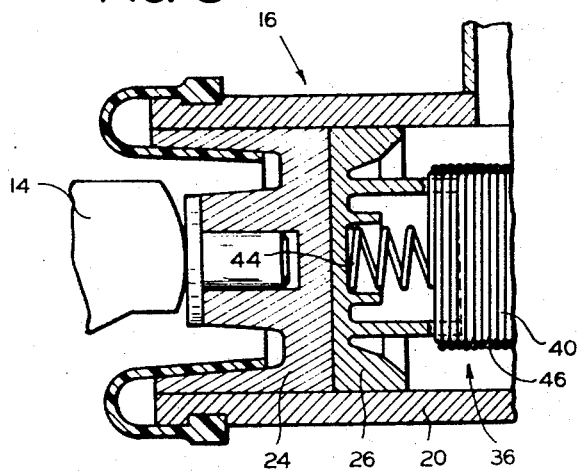
FIGURE 3 is a fragmentary longitudinal section similar to FIG. 2 showing the condition of my invention when the actuator is energized.

When actuator 16 is not energized and there has not been any wear of brake shoes 14 adjuster 36 is disposed as shown in FIG. 2. Outer portions 44 of spring 38 are compressed and intermediate portion 40 is fully compressed. Torsion spring 46 encircles intermediate portion 40 of spring 38, as shown in FIG. 2. When pressurized fluid is supplied to chamber 32 causing seals 26 and piston 24 to move outwardly so that brake 10 is engaged the outer portions 44 of spring 38 extend prior to any extension of intermediate portion 40 of spring 38 since the spring rate of each portion 44 is higher than the spring rate of portion 40. The length of outer portions 44 is chosen so that the expansion of spring portions 44 corresponds substantially to the amount of movement of shoes 14 between the brake engaged and brake released positions without permitting any expansion of spring 40. Now, as brake shoes 14 wear it will be necessary for them to move further outwardly in order for brake 10 to be engaged. When this occurs spring portions 44 expand to their limit or substantially their limit of expansion, and then spring portion 40 expands. When spring portion 40 expands the turns 42 thereof move apart from each other slightly, thereby permitting turns 48 of spring 46 to begin to interleave with turns 42. The spring rate of spring 46 and return spring 18 is chosen so that when actuator 16 is deenergized the force of spring 18 is not high enough to return spring 46 and spring portion 40 to the condition shown in FIG. 2, but at the same time prevents spring 46 from extending spring portion 40 to the position shown in FIG. 4, except as brake shoes 14 wear, and thus permit further outward extension of seals 26 and pistons 24 and further outward extension of spring portion 40.

It will be understood that the foregoing detailed description is intended to be illustrative only and that various modifications and changes may be made to my invention without departing from the spirit and scope of it. For example, spring 38 can be modified by removing one of outer portions 44 so that the spring comprises only two portions having differing spring rates.

What is claimed is:

1. For use with a brake actuator having a bore and a pair of spaced apart pistons slidably disposed in the bore, a brake wear adjuster comprising a helical compression spring disposed in the bore intermediate the pistons, the said compression spring having a plurality of turns, a first portion with a given spring rate and a second portion with a spring rate lower than the said given spring rate, and means for permitting the said second spring portion to expand only.

2. A brake wear adjuster as set forth in claim 1 wherein the said means is a helical torsion spring having a plurality of turns, the said torsion spring being disposed to encircle the said second spring portion so that the turns of the said torsion spring tend to force the turns of the said second spring portion apart.

References Cited

UNITED STATES PATENTS

| | | | |
|---|---|---|---|
| 1,934,235 | 11/1933 | Rockwell. | |
| 3,255,851 | 6/1966 | Griesenbrock | 188—196 |
| 3,410,373 | 11/1968 | Pace | 188—196 |

DUANE A. REGER, Primary Examiner

U.S. Cl. X.R.

188—79.5; 267—1